United States Patent
Gray

(10) Patent No.: US 8,316,822 B2
(45) Date of Patent: Nov. 27, 2012

(54) SPEED LIMITER SYSTEM

(75) Inventor: George Malcolm Gray, Oldham (GB)

(73) Assignee: Autokontrol Limited, Oldham (GB)

( * ) Notice: Subject to any disclaimer, the term of this patent is extended or adjusted under 35 U.S.C. 154(b) by 443 days.

(21) Appl. No.: 12/299,757

(22) PCT Filed: May 11, 2007

(86) PCT No.: PCT/GB2007/001751
§ 371 (c)(1),
(2), (4) Date: Jul. 9, 2010

(87) PCT Pub. No.: WO2007/132213
PCT Pub. Date: Nov. 22, 2007

(65) Prior Publication Data
US 2010/0282209 A1 Nov. 11, 2010

(30) Foreign Application Priority Data
May 11, 2006 (GB) .................................. 0609318.1

(51) Int. Cl.
*F02D 41/26* (2006.01)
(52) U.S. Cl. ......... 123/350; 123/399; 123/361; 701/110
(58) Field of Classification Search .......... 701/106–107, 701/110; 123/399, 350, 361
See application file for complete search history.

(56) References Cited

U.S. PATENT DOCUMENTS

| | | | |
|---|---|---|---|
| 5,492,095 A * | 2/1996 | Hara et al. | 123/339.19 |
| 6,166,658 A | 12/2000 | Testa | |
| 6,347,680 B1 * | 2/2002 | Mianzo et al. | 180/197 |
| 6,615,943 B1 | 9/2003 | Gustafsson | |
| 6,766,785 B2 * | 7/2004 | Ishida et al. | 123/399 |
| 6,898,507 B2 * | 5/2005 | Aoyama et al. | 701/93 |
| 2003/0200021 A1 | 10/2003 | Aoyama et al. | |
| 2004/0187845 A1 | 9/2004 | Clemence | |
| 2005/0004736 A1 * | 1/2005 | Belcher et al. | 701/50 |

FOREIGN PATENT DOCUMENTS

| | | |
|---|---|---|
| DE | 19654218 A1 | 7/1998 |
| DE | 102004048468 A1 | 4/2006 |
| FR | 2868362 A1 | 10/2005 |
| WO | 03059677 | 7/2003 |

* cited by examiner

*Primary Examiner* — Hai Huynh
(74) *Attorney, Agent, or Firm* — Trego, Hines & Ladenheim, PLLC

(57) ABSTRACT

A vehicle speed limiter is described, for use with, and for example fitted to, a vehicle throttle system (1) comprising a mechanically actuatable throttle member (3), an engine (10) speed controller (7), and a throttle signal unit in data communication with an engine speed controller and operably coupled to the throttle member so as to generate an electronic throttle signal in functional response to the degree of actuation of the throttle member, and to transmit a throttle signal to the engine speed controller whereby the engine speed is controlled. The speed limiter has a vehicle speed sensor (15) to obtain a signal indicative of vehicle speed; a limit speed data register to include a data store (17) for a data item indicative of at least a first predetermined limit speed; a comparator to compare the speed sensor output with the limit speed data item stored in the limit speed register; a throttle signal modifier unit acting on the output of a throttle signal unit in use when fitted in conjunction with a vehicle throttle system to modify a generated throttle signal so that a transmitted throttle signal is produced such as to tend to limit the vehicle to the applied limit speed. A method of fitment is also described.

16 Claims, 1 Drawing Sheet

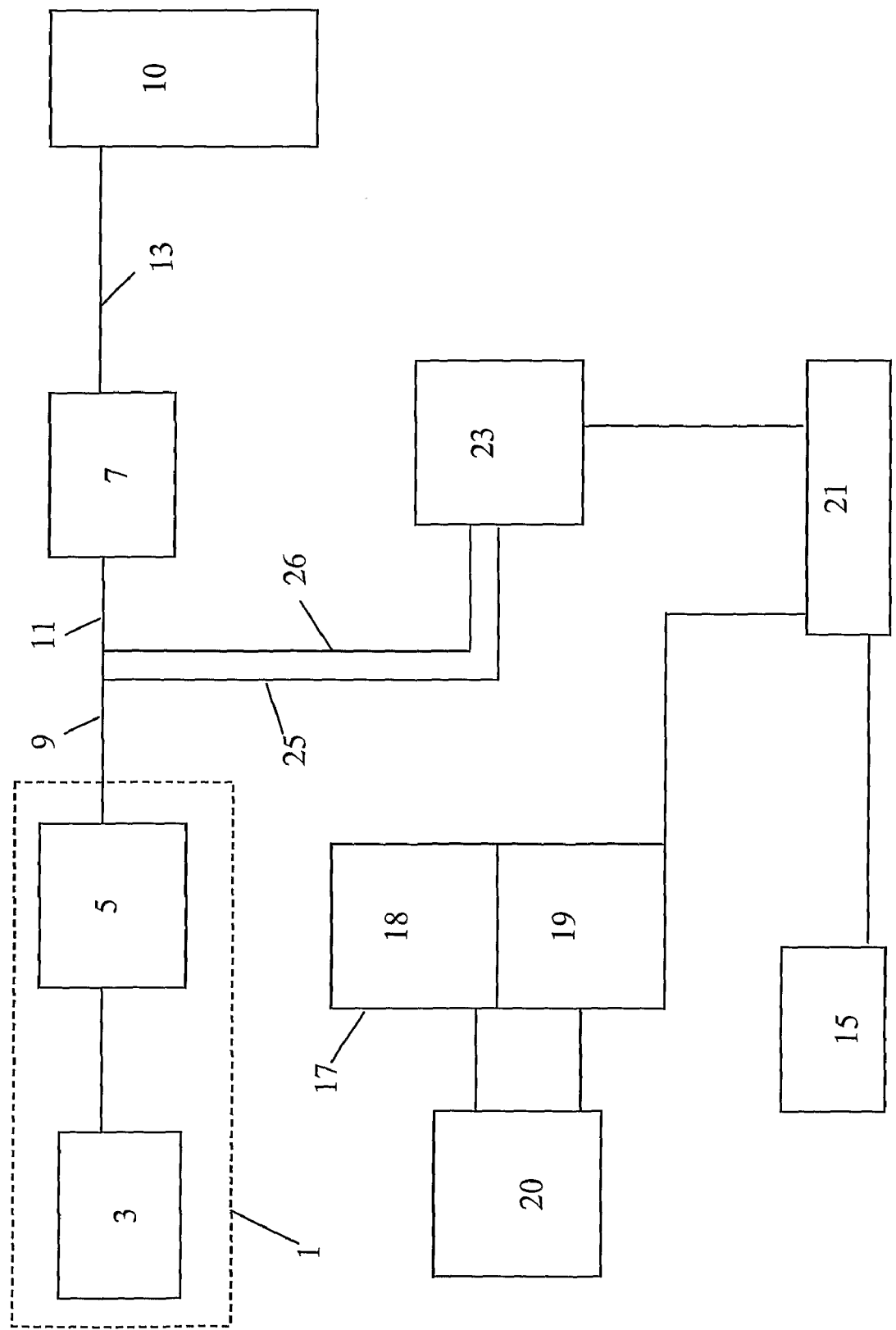

SPEED LIMITER SYSTEM

BACKGROUND OF THE INVENTION

The invention relates to a speed limiter system for an automobile or the like. The invention in particular relates to a speed limiter system adapted for use in vehicles in which an electromechanical throttle actuator including a mechanical actuator such as an accelerator pedal is associated with suitable signal generation means and is coupled to and controls the operating engine speed electronically rather than by direct mechanical linkage.

Automobile vehicles are widely used for personal and public transportation and for the transportation of goods. It is well established that for a variety of reasons an owner or operator of a vehicle might wish to limit the speed of the vehicle to a predetermined maximum, for example for economical or safety reasons, to comply with legislative or regulatory regimes, or for some other purpose.

Vehicle speed is usually controlled and varied by operation of a driver-operated system which acts to vary the engine speed and consequently the speed transmitted to the drive system. Such a system is commonly called a throttle system. Most commonly, the speed contract or throttle system is actuated by a foot-operated accelerator or gas pedal that can be depressed by the driver, the extent of the depression being set up to control engine speed. Manual accelerator devices such as handles are also known.

In traditional mechanically driven speed control or throttle systems, the accelerator pedal, handle or the like was mechanically coupled to a throttle valve in the fuel/air delivery system such that depression or other operation of the pedal, handle or the like opened the valve, increased the fuel/air supply, and caused an increase in engine and hence vehicle speed. From the throttling action of the valve, the term came to be used loosely for the entire engine speed control system. In such mechanical throttle systems, the speed can be limited in a number of mechanically driven ways, for example by providing a secondary means to limit the extent to which the valve can open, by disengaging the throttle pedal or handle from the valve at the desired speed etc. In particular, speed limiter systems might be fitted which acted to limit fuel or fuel/air flow into the system, for example by a suitably placed valve means fitted within a fuel supply line.

Newer vehicles increasingly operate so-called "drive-by-wire" engine speed control systems in which a direct mechanical link between the mechanical accelerator actuator and a throttle valve or other control mechanism is no longer present. Instead, an indirect electronic or electromechanical system is used, typically incorporating an electromechanical accelerator actuator unit. This electromechanical system is set up so that when a mechanically actuated throttle actuator such as an accelerator/gas pedal or handle is depressed or otherwise operated in the usual way an electrical signal is generated which can be processed via an engine management system to control the engine speed in any suitable manner, for example by control of fuel and/or air intake or otherwise. As used herein, "throttle" is used in the broadest loose sense to refer to the actuation system to control engine speed, and does not imply only a system where the engine has a classical throttled carburettor intake, but is intended to cover any actuation system to control engine speed, in particular by controlling the fuel and/or air intake of the engine in any manner.

In electronic systems, the signal generated by the throttle actuator still varies in some functional relationship with the extent of actuation, and for example with the extent to which an accelerator pedal or handle is depressed or otherwise operated. As in fully mechanical systems, the system will be configured such that a greater extent of actuation, for example greater depression of the accelerator pedal, generates a greater signal that will tend to be interpreted by the engine management system as instructing a greater engine speed. However, there is no direct mechanical actuation link between the accelerator pedal, handle or other throttle means and a throttle valve, fuel injection system, or other control means controlling engine speed.

For the reasons set out above, a number of circumstances are still likely to arise where there might be perceived to be a need to limit the vehicle speed to a predetermined maximum. However, there is no longer a direct mechanical link within the throttle system, and purely mechanically limiting devices of the sort which have been developed for such direct mechanical throttle systems are no longer necessarily applicable.

Most drive-by-wire vehicles include complex electronic engine management systems which have as only one of their functions the receipt of an input signal from the electromechanical throttle means and the use of this signal to control engine speed. Such engine management systems might include more complex capabilities associated with a cruise control function and the setting of a cruise control speed. While such engine management systems could therefore be used, subject to modification, to set a maximum speed, they are likely to be an unnecessary complex and expensive alternative where only a simple predetermined upper limit speed is required. When a simple limit speed is desired, an option that does not necessarily require a complex engine management computer is desirable.

Difficulties can arise with fitment of a simple secondary limit device in vehicles with a complex engine management system, especially where the device is of a type that acts to limit fuel or fuel/air flow into the engine. Many conventional complex engine management systems are likely to treat such an unexpected variation in fuel flow as a fault, and may shut the engine down or revert to some safe mode of operation. Other systems may continue to operate, but in a such a manner, given the unexpected variation in fuel flow, as to risk long term damage. Thus, fitment of a secondary system that restricts or interrupts fuel supply might not be compatible with a vehicle engine management system.

As a secondary consideration, which is especially encountered for large vehicles likely to handle multiple terrain conditions, such as trucks or wagons for both road and off road (for example, quarry/mine/construction site) use is the desire to have a lower limit speed applied to the rough terrain. Again, it is desirable that a vehicle speed limiter system can provide a simple mechanism to effect a limit at either speed with a throttle system that does not have a direct mechanical link. Again, since a simple limit speed is desired, an option which does not necessarily require complex modifications to an engine management computer is desirable.

BRIEF SUMMARY OF THE INVENTION

It is an object of the present invention to provide a vehicle speed limiter system adapted for vehicles with a "drive-by-wire" engine speed control or throttle system which mitigates some or all of the above disadvantages, and which in particular does not require complex modification to or fitment of a particular engine management system.

It is a particular object of the present invention to provide a vehicle speed limiter system which can be fitted as an after market modification or design modification to existing vehicles with "drive-by-wire" throttle systems, without requiring extensive modification to or fitment of complex engine management systems.

Thus, in accordance with the invention in its broadest aspect, a vehicle speed limiter is provided suitable for use with a vehicle throttle system comprising a mechanically actuatable throttle member, an engine speed controller, and a throttle signal unit in data communication with an engine speed controller and operably coupled to the throttle member so as to generate an electronic throttle signal in functional response to the degree of actuation of the throttle member, and to transmit a throttle signal to the engine speed controller whereby the engine speed is controlled.

The system is thus a "drive-by-wire" throttle system, in which an electromechanical throttle unit sends a signal electronically to an engine speed controller and thus effects control of engine speed in any suitable manner, for example by controlling fuel and/or air input to the engine and for example controlling fuel injection rates.

The vehicle speed limiter system is characterised in that it comprises a vehicle speed sensor to obtain a signal indicative of vehicle speed; a limit speed data register to include a data store for a data item indicative of at least a first predetermined limit speed; a comparator to compare the speed sensor output with the limit speed data item stored in the limit speed register; a throttle signal modifier unit acting on the output of the throttle signal unit in use when fitted in conjunction with a vehicle throttle system as above to modify the generated throttle signal as necessary so that a transmitted throttle signal is produced such as to tend to limit the vehicle to the applied limit speed.

Thus, in a vehicle speed limiter system in accordance with the invention when fitted to a suitable vehicle throttle system, there is a throttle member provided which is mechanically actuated and operable to varied extent in conventional manner, and for example comprises the accelerator pedal or other accelerator control of a vehicle. The throttle member is linked to a throttle signal unit to provide an electromechanical combination system which generates a signal in a functional relationship to the extent to which the throttle member is actuated, and for example to the extent to which the accelerator pedal is depressed.

In accordance with the invention, the speed limiter system acts directly on this generated signal to modify the generated signal to the point where the signal ultimately transmitted to the engine speed controlling mimics the signal which would correspond to a throttle operation appropriate to the limit speed.

By operating in this way, the speed limiter can be kept as a simple unit. It operates directly to modify the electromechanically generated throttle signal, in advance of any downstream engine management systems. It operates independently of, does not require, and where present does not require modification of, such complex engine management systems. It can be incorporated easily into an existing engine control system, and can be incorporated as an after market fitment to an existing drive-by-wire system.

It is important to emphasise that a vehicle speed limiter system in accordance with the first aspect of the present invention is particularly suited to this versatile application because it does not interact with any engine speed controller or engine management system otherwise provided on the vehicle. It is fitted with a throttle signal modifier unit in a position upstream (in a data communication sense) of such a speed controller or management system, and directly downstream (in a data communication sense) of a throttle signal unit. The throttle signal modifier unit acts directly on the throttle signal. In the event that the throttle signal unit is generating a signal which would be interpreted by the engine speed controller in such manner as to cause the engine to be run at a speed which would cause the vehicle to exceed the limit speed, the throttle signal modifier unit acts on this signal to modify the signal ultimately transmitted to the engine speed controller so that it mimics a signal which would correspond to a throttle member position causing the vehicle to remain at or tend back towards the limit speed.

From the perspective of the engine speed controller or engine management system this modification to the signal it ultimately receives is not visible. As far as the engine speed controller is concerned it is merely as if the throttle actuator member has an actuation position only sufficient to maintain the vehicle at or tend to cause the vehicle to come towards the limit speed. Since the signal is identical to that which would be produced simply by holding the throttle actuator member in a limit position the engine speed controller reacts as if this is simply the case, and acts accordingly. There is no specific interaction beyond this between the engine speed controller and the throttle signal modifier unit, and the engine speed controller therefore requires no particular modification.

In particular, there is no potential incompatibility where the engine speed controller is part of a complex engine management system as there might be with a more traditional speed limiter involving fitment of a secondary fuel flow limit valve or the like. The limiter of the invention does not affect fuel flow directly and separately in a manner that might be "seen" as a fault or problem by the engine management system, but rather acts on the throttle signal itself in a manner that is not "seen" by the engine management system.

The throttle signal modifier unit is adapted for attachment in use in a data communication position between the throttle signal unit and the engine speed controller. In one possible embodiment, the throttle signal modifier unit acts as a switch, responsive to the limit speed in that whilst the vehicle travels below the limit speed it allows the throttle signal to pass on to the engine speed controller directly, but at the limit speed it acts to block a direct signal from the throttle signal unit and instead transmits a modified signal being a signal corresponding to a throttle member position which would tend to cause the vehicle to remain at or tend towards the limit speed.

It will be understood that references to storing of or making reference to a limit speed and to obtaining a signal reading of a vehicle speed from a suitable sensor, will encompass respectively the storing and reading of any data item with a functional relationship to vehicle speed. In particular, it is self evidently not necessary for such a data item to be stored or read in such a form that a vehicle speed in any particular unit of measurement can be read directly therefrom: rather, it is merely necessary that a limit speed data item is stored and a measured speed data item is obtained from a sensor signal in such a format as to allow a comparison by the comparator, either directly or through suitable numerical analysis, and thus to enable the comparator to distinguish between the two states of "vehicle below limit speed" and "vehicle not below limit speed".

A bespoke speed sensor may be provided, or use may be made of an existing vehicle system allowing for the sensing of speed the speed sensor being adapted to make use of such an existing vehicle. For example, the speed sensor may make use of the vehicle speedometer. The speed sensor is adapted for fitment to the vehicle speedometer system to obtain a reading of speed therefrom. This is an illustration of the point in the foregoing paragraph. A typical vehicle speedometer operates by measuring the frequency of rotation of the transmission system, for example via a mechanical coupling. A vehicle speed sensor fitted in conjunction with such a system in accordance with the invention would measure this frequency as a vehicle speed data item, and the comparator would compare this to a limit frequency recorded in the data store as the limit speed data item.

The throttle actuator member is typically for example based upon an accelerator pedal and further discussion of a typical system assumes this by way of example. However, the invention is applicable to any electromechanical throttle comprising a mechanical actuator such as a pedal, handle or the like coupled to a throttle signal unit comprising a means to generate an electronic signal as and in functional relationship to the operation of the mechanical actuator.

The throttle signal unit has or inherently comprises a sensor means to measure the extent of actuation of the throttle member, and for example to measure the extent of depression of the accelerator pedal. A throttle signal is generated in functional relationship to the extent of actuation of the throttle member.

In one embodiment, the throttle signal unit includes a signal generator such as a potentiometer configured such that a varying electronic signal is in inherently produced as the throttle member is operated to a varying extent, and for example as the accelerator pedal or other actuator is increasingly depressed. The potentiometer or like means thus serves in admirably simple manner as both a "sensor means" in that it is responsive to the extent of the actuation of the throttle and as part of the signal generation system, in that the generated signal is inherently varied thereby. Such systems will be known from existing electromechanical throttle mechanisms in existing "drive-by-wire" vehicles.

In an embodiment of the invention configured for use with such an embodiment of throttle signal unit, the signal modifier unit is configured to be able to modify the generated electronic signal where necessary to limit the engine speed in that it is electrically connected to the potentiometer or other electronic signal generator and pulls the generated voltage lower than it would otherwise be set to by the operation of the throttle member without operation of the speed limiter of the invention. The resultant transmitted signal is seen by the engine speed controller as a fixing or easing off of the throttle, and the engine speed controller limits or reduces the engine speed and hence vehicle speed accordingly, for example by controlling fuel supply to the engine, for example via a suitable fuel injection system.

A vehicle speed limiter in accordance with any preceding claim adapted for use with a throttle signal unit including an electronic signal generator configured such that a varying electronic signal is in inherently produced as the throttle member is operated to a varying extent in that the signal modifier unit is able to modify the generated electronic signal in that it is electrically connected to the electronic signal generator and by pulling the generated voltage lower than it would otherwise be set to by the operation of the throttle member without operation of the speed limiter of the invention.

Thus, when the speed limiter system detects that the vehicle is in danger of being caused to move faster than the predetermined limit speed, it reduces the generated throttle signal, and in the case of the embodiment the potentiometer voltage, so that the potentiometer voltage or other signal "seen" by the engine speed controller is such as to tend to limit the vehicle to the applied limit speed to ensure that the correct speed is maintained and not exceeded. The system may do this simply by comparing the actual and limit speed and reacting by cutting the throttle signal only when the limit speed is exceeded, or may do this in a more sophisticated manner by comparing the actual and limit speed and reacting by cutting the throttle signal progressively as the limit speed is approached from below within a margin. The system is adapted to operate continuous successive cycles of speed sensing and throttle signal modification as necessary. In this way, there is effectively constant monitoring of the road speed and adjusting of the generated signal, for example being the potentiometer voltage, such that the speed is maintained at the limit until the throttle member is released to a point where the speed drops below the limit.

The system preferably includes speed limit control means adapted to effect such successive monitoring, and preferably further adapted to apply the proportional control technique whereby, as the comparator detects that the set speed is approached to a certain predetermined degree of closeness, the signal modifier begins to apply a signal modification which becomes stronger the near the vehicle comes to the set speed.

In one possible embodiment the throttle signal modifier unit may include a switching control unit which acts to pass an unmodified throttle signal when the comparator indicates that vehicle speed is below limit speed, but acts to block the unmodified signal and/or transmit on a modified signal that tends to hold the vehicle at the limit speed when the comparator indicates that the limit speed has been reached or is being approached.

The throttle signal modifier unit is adapted for attachment in use to sit in data communication between the throttle signal unit and the engine speed control unit and conveniently to effect this attachment includes an input in data communication with the throttle signal unit to receive an input signal comprising an unmodified throttle signal from the throttle signal unit and an output in data communication with the engine speed control unit to output a throttle signal thereto which is optionally modified as above described.

In electromechanical throttle systems incorporating a potentiometer as above described, dual potentiometers are typically provided for redundancy. For safety reasons, the engine management system is then typically adapted to operate fully only if the two generated signals are essentially in agreement, and to revert to a safer mode of operation in the event of any malfunction. For use in such a system, the signal modifier may be adapted to operate correspondingly on each such potentiometer, or separate signal modifiers may be provided similarly operating on each potentiometer.

Means may be provided to vary the limit speed and for example to allow a user to input a limit speed before use.

In a preferred embodiment, the invention is adapted to allow for the storage of a plurality of limit speeds, and to allow a user to switch between limit speeds and to allocate a limit speed to be applied selectively. To that end the data register includes a register to store a plurality of limit speeds, and for example at least a first limit speed and a second limit speed, an applied limit speed register to store a speed to be applied, and a means to select for storage in the applied speed limit register one of the said stored limit speeds. Again, it will be understood that references to a stored "speed" are references to a stored item of data having a functional relationship to vehicle speed, and therefore available to the comparator in making its comparison.

A variety of reasons can be imagined why it might be desirable to have multiple limit speeds. For example, different limits may be set by regulatory regimes or for varying policy reasons for different driving conditions, and for example different road conditions, or in different regulatory jurisdictions. Choice of applied limit speed, and switching between different stored limit speeds as the applied limit speed, may be effected automatically or by manual actuation, for example via manual input means.

Certain classes of vehicles are particularly commonly driven both on and off road. In a particularly preferred embodiment, a speed limiter system in accordance with the first aspect of the invention is modified to provide a first limit speed and a second limit speed selected as to be appropriate limits respectively for such off and on road conditions. Preferably, switching between the two limit speeds is effected automatically, in that the system is further provided with a vibration sensor of a suitable sensitivity to tend to be actuated in off road conditions but not in driving conditions typically encountered on properly paved roads.

In this embodiment the limiter system comprises a data register to store at least a first limit speed and a second limit speed, and an applied limit speed register to store one such limit speed as an applied limit speed; a vibration sensor and vibration control means configured such that the applied speed is set to the first limit speed below a vibration threshold level and to the second limit speed above a vibration threshold level; a vehicle speed sensor to output a signal indicative of vehicle speed; a comparator to compare the speed sensor output with the limit speed in the applied limit speed register; a throttle system modifier acting on the output of the throttle signal unit in use when fitted in conjunction with a vehicle throttle system as above to modify the generated throttle signal so that the transmitted throttle signal is such as to tend to limit the vehicle to the applied limit speed.

The invention in the preferred embodiment thus further comprises a vibration sensor for example incorporating a trembler switch and trembler control. Passage of the vehicle over rough terrain trips the trembler switch and causes the lower speed limit to be placed in the applied speed limit register and to be applied by the system. Thus, the trembler unit can detect when a vehicle is driven onto a rough surface and implement second lower speed limit. The control unit may be set up to require multiple trips of the trip switch within a predetermined time period before applying the lower limit speed to avoid a single bump causing the lower limit speed to be applied.

Limit speeds may be hard programmed into the system by means of a permanent memory register or may be programmable by a user. If the latter alternative is desired, the system may further comprise suitable input means to input the limit speeds and optionally further display means to display the operable limit speeds.

The vehicle speed limiter requires dynamic operation in conjunction with a sensor detecting vehicle speed. The system may include a specific sensor for this purpose, but most conveniently makes use of an existing sensor fitted into the vehicle control system. For example, this may be a speed transducer on the gearbox or a speed sensor in an automatic braking system.

In some instances, it can further be desirable to limit to a maximum the engine revolutions. The system of the invention could be adapted to give this as a secondary function. In such an embodiment, it would further include a means to measure engine revolution speed, which again would conveniently be an existing revolution sensor, with the memory register being further adapted to include a suitable maximum limit figure, and a comparator being adapted to effect a comparison of both sensor readings with their respective maximer, and to cause the necessary signal modification in the event that either signal should exceed the maximum.

The precise structure of the engine speed controller is not pertinent to the invention, and may be anything from a relatively simple throttle mechanism or fuel injection flow control mechanism to a complex computerised engine management system controlling various operational parameters such as fuel and/or air injection rates. The key feature of the invention is that it operates to adjust the input signal to this engine speed controller, and therefore requires no particular type of controller and no modification to such a controller when it is fitted.

In accordance with a further aspect of the invention, a vehicle throttle and engine speed control system is provided comprising a speed limit system in accordance with the first embodiment fitted in conjunction with a vehicle throttle system comprising a mechanically actuatable throttle member, an engine speed controller, and a throttle signal unit in data communication with the engine speed controller and operably coupled to the throttle member so as to generate an electronic throttle signal in functional response to the degree of actuation of the throttle member, and to transmit a throttle signal to the engine speed controller whereby the engine speed is controlled.

Thus a vehicle throttle and engine speed control system in accordance with the further aspect comprises a mechanically actuatable throttle member; an engine speed controller; a throttle signal unit in data communication with an engine speed controller and operably coupled to the throttle member so as to generate an electronic throttle signal in functional response to the degree of actuation of the throttle member, and to transmit a throttle signal to the engine speed controller whereby the engine speed is controlled; a vehicle speed sensor to obtain a signal indicative of vehicle speed; a limit speed data register to include a data store for a data item indicative of at least a first predetermined limit speed; a comparator to compare the speed sensor output with the limit speed data item stored in the limit speed register; a throttle system modifier acting on the output of the throttle signal unit in use when fitted in conjunction with a vehicle throttle system as above to modify the generated throttle signal so that the transmitted throttle signal is such as to tend to limit the vehicle to the applied limit speed.

Thus, the speed limiter acts directly on the generated throttle signal to modify the generated signal to the point where the signal ultimately transmitted to the engine speed controlling unit mimics the signal which would correspond to a throttle operation appropriate to the limit speed.

Preferred features of the complete system of the second aspect of the invention will be understood from the description of the limit system of the first aspect.

In accordance with a further aspect of the invention, a vehicle is provided fitted with a vehicle throttle and engine speed control system in accordance with the foregoing. The vehicle is for example an automobile.

In accordance with a further aspect of the invention, there is provided a method of fitment, especially as an after-market modification, of a vehicle speed limiter to a vehicle having a throttle system comprising a mechanically actuatable throttle member, an engine speed controller, and a throttle signal unit in data communication with the engine speed controller and operably coupled to the throttle member so as to generate an electronic throttle signal in functional response to the degree of actuation of the throttle member, and to transmit a throttle signal to the engine speed controller whereby the engine speed is controlled, the method comprising the fitment of a vehicle speed limiter in accordance with the first aspect of the invention such that the throttle system modifier is configured to be able to act to act on and modify where necessary the generated electronic throttle signal in the manner above described.

That is to say, the method comprises fitting a vehicle speed sensor to obtain a signal indicative of vehicle speed; fitting a control unit in data communication therewith comprising a limit speed data register to include a data store for at least a first predetermined limit speed, a comparator to compare the speed sensor output with the limit speed stored in the limit speed register, and a throttle system modifier unit; wherein the throttle signal modifier unit is fitted in data communication with and able to act directly upon on the output of the throttle signal unit when so fitted to modify the generated throttle signal so that a throttle signal transmitted to the engine speed controller is such as to tend to limit the vehicle to the applied limit speed.

Thus the modifier acts on the generated signal to modify the generated signal to the point where the signal ultimately transmitted to the engine speed controller mimics the signal which would correspond to a throttle operation appropriate to the limit speed. It is fitted into the system and operates directly to modify the electromechanically generated throttle signal in advance of any downstream engine management systems. This makes it ideal as an after market fitment to an existing drive-by-wire system in accordance with the method of this aspect of the invention.

DETAILED DESCRIPTION OF THE INVENTION

The invention will now be described by way of example only with reference to FIG. 1 of the accompanying drawings in which a schematic representation is given of the arrangement necessary to operate an embodiment of the invention having a trembler switch to switch between two limit speeds in conjunction with a simple vehicle engine management system.

The system is a "drive-by-wire" type system in which an electromechanical throttle (1) controls the speed of an engine (5) (and hence a vehicle) via an electronic signal transmitted through and processed by an engine management system controller (7) which includes at least an engine speed controller.

Ultimate user control is effected by actuation of a mechanical throttle actuator (3), which in this typical example comprises an accelerator/gas foot pedal mounted within a vehicle cabin to be accessible by and operable by the driver. The mechanical actuator (3) is mounted in conjunction with a throttle signal generation means (5) which generates an electronic throttle signal corresponding to the extent to which the mechanical actuator is operated. In the present example, depression of the accelerator pedal operates in conjunction with a pair of potentiometers to generate a functionally related electronic throttle signal corresponding to the extent to which the pedal is depressed.

The resultant electronic throttle signal is passed via the data communication (9) and transmitted via the data communication (11) to an engine management system computer (7) which inclues at least an engine speed controller. Where the speed limiter components are not operating, the generated signal (9) corresponds to the transmitted signal (11), and the latter is processed by the engine speed controller and used to control the speed of the engine (10) via the data link (13).

A pair of potentiometers is used in the example (not shown) in the signal generation system (5) to give a degree of redundancy for safety. A pair of throttle signals is thereby generated, each signal being transmitted to and processed separately by the engine management system. In the event that the signals essentially correspond, within a pre-set safety margin, that is taken as the intended throttle signal, and the system operates accordingly. In the event that there is an excessive differential between the signals in the pair, which is likely to arise for example if there is a fault with one of the potentiometers or its corresponding data link, the engine management system will be designed to detect this as a fault. It might then refuse to operate the throttle system, or to operate the throttle system only in a safe mode (for example applying a predetermined limit), until the fault can be rectified.

To the above extent, the throttle is essentially a conventional drive-by-wire throttle system. However, the schematic example illustrates such a throttle system modified, either by prior manufacturer's design or as an after market fitment, with a speed limiter system in accordance with the invention.

The speed limiter system first includes a speed sensor (15). Again, for practical purposes, this is likely to make use of an existing speed sensor within the vehicle, for example provided within the transmission system or braking system, although a specific additional speed sensor could alternatively be provided. The speed sensor will normally be such as to sense, directly or indirectly, the vehicle speed, since it is this that it is ultimately the intention of the system of the invention to limit. For example the speed sensor (15) is fitted to and takes a signal from a vehicle speedometer and thus senses vehicle speed indirectly by taking a direct reading of the rotational speed/frequency of the transmission shaft.

Additional sensors may be provided for example to limit engine speed (for example to set a maximum engine revolutions rate) and the skilled person would readily appreciate that these additional sensors could similarly be incorporated into a limiter system of the invention with minimal trivial further modification. However, they are not directly pertinent to the present invention, which is primarily a means to limit vehicle speed a predetermined limit and, in the present illustrative embodiment, to one of at least a pair of predetermined maximum speeds, being a normal road speed and an off-road speed.

Maximum speeds are set in the data store (17). The data store (17) in this embodiment includes at least a first data register (18) including at least two locations in which separate maxima relating to normal road and rough terrain conditions can be stored, and a second register (19) which is intended to store the currently operable maximum speed. The different maximum speeds stored in the data register (18) may be hard stored or may be user settable. In the case of user settable limits, a suitable data input means, for example comprising a keypad or the like (not shown) may be provided.

In the embodiment, two limit speeds are stored, and selection between them is effected automatically in the manner below described using a vibration sensor. This is an illustrative example only. A data register may provide for the storage of a single limit speed only. Multiple limit speeds may be stored for other reasons. If multiple limit speeds are stored, selection between may be made in other ways either automatically in accordance with some pre-determined or sensed condition or by a user selection action.

In the illustrated embodiment, selection between the two limit speeds, and the choice of which limit speed is to be stored in the register (19) as the currently operable maximum speed is effected by a vibration monitor system which is intended to be of a sensitivity such as to detect whether the vehicle is on or off road. The vibration monitor system (20) includes a vibration sensor such as a trembler switch, and suitable electronic control means which determine conditions under which the switch is considered to be tripped, as a result of which a different limit is selectively to be applied. The vibration monitor system (20) reads the limits from the first data register (18) via the communication link, determines which of these limits is operable based on its vibration state, and applies this in the applied data register (19) via the communication link. Thus, where such vibration conditions as are necessary to register with the trembler switch control means are complied with, an appropriate lower speed limit is passed from the data store (18) to the applied register (19) and in the event such vibration conditions are not complied with, an appropriate higher speed limit is passed to the applied data register (19). It is of course possible without departing from the principles of the invention to have a vibration system sensitive to several discrete degrees of vibration, and to apply several different limit speeds correspondingly.

The purpose of these varied limits is to set a different maximum speed for road and off-road conditions. A number of vehicles, in particular large, heavy vehicles such as trucks, are specifically designed for heavy operation both on and off road. Maximum speeds which might be set by a regulatory regime or otherwise as suitable for paved roads, are entirely inappropriate for use off such a road, for example on a roughly made site road. The system of the invention applies a different maximum speed dependent upon the roughness of terrain.

The speed to be applied by the system is stored in the applied data register (19). A comparator (21) is in data communication with and reads both the detected speed at the speed sensor (15) and the stored applicable limit speed in the data register (19). The comparator (21) acts in conjunction with a throttle signal modifier unit (23) to tend to modify the signal transmitted via the data link (11) to the engine speed management system so as to limit the vehicle speed to the pre-set speed.

This modification is effected via the data links (25, 26). Via the input data link (25) the throttle signal modifier unit (23) receives a throttle signal (9) generated by the throttle assembly (3, 5). At below limit speed this is passed on via the output data link (26) unmodified as a transmitted signal (11) identical to the generated signal (9). If the limit is reached the throttle signal modifier unit (23) blocks direct transmission of and modifies the generated signal (9) so as to produce a different transmitted signal (11) read by the engine speed management system (7).

The engine speed management system is "fooled" into receiving a transmitted signal (11) which corresponds to an apparent level of throttle actuation that tends to limit the speed to, and bring the vehicle speed within, the limit speed. In the specific example, where the throttle signal is generated by a pair of potentiometers, the throttle signal modifier (23) acts via the data links (25, 26) to draw off some of the potential generated by the potentiometers and thus cause the apparent signal (11) received by the engine management system to appear to correspond to a depression of the accelerator which would limit the engine speed, and hence vehicle speed, to the desired limit.

It will be readily understood that the comparator and throttle signal modifier system can work in a number of ways without departing from the general principles of the invention. At it simplest, the comparator merely compares the measured speed with the limit speed, and acts in conjunction with the throttle signal modifier only if the sensed speed is or exceeds the limit speed to limit the apparent signal (11) received by the engine management system to one which would correspond to the limit speed. However, it will be generally be preferred, and in the present example it is assumed, that the comparator operates a more sophisticated algorithm whereby, as the sensed speed tends to approach the limit speed from below, the throttle signal modifier is caused progressively to apply to seek to limit the effect of actuation of the throttle more progressively, and thus to seek to limit the vehicle speed at or below the applicable limit in a more smooth and controlled manner.

Thus, the system of the invention offers an admirable solution to the problem of limiting speeds in drive-by-wire throttle systems, which requires no complex modification to any existing engine management system, and is therefore admirably suited to incorporation into existing designs either as a pre- or after market fitment thereto.

The invention claimed is:

1. A vehicle speed limiter for use with a vehicle throttle system comprising a mechanically actuatable throttle member, an engine speed controller, and a throttle signal unit in data communication with the engine speed controller and operably coupled to the throttle member so as to generate an electronic throttle signal in functional response to the degree of actuation of the throttle member, and to transmit a throttle signal to the engine speed controller whereby the engine speed is controlled; the vehicle speed limiter comprising: a vehicle speed sensor to obtain a signal indicative of vehicle speed; a limit speed data register including a data store for a limit speed data item indicative of at least a first predetermined limit speed; a comparator to compare the speed sensor output with the limit speed data item stored in the limit speed register; and a throttle signal modifier unit acting on the output of the throttle signal unit in use when fitted in conjunction with a vehicle throttle system to modify the generated electronic throttle signal so that a transmitted throttle signal is produced so as to tend to limit the vehicle to the applied limit speed.

2. A vehicle speed limiter in accordance with claim 1 wherein the throttle signal modifier unit is adapted for attachment in use in data communication between the throttle signal unit and the engine speed control unit in that it includes an input in data communication with the throttle signal unit to receive an input signal comprising an unmodified throttle signal from the throttle signal unit and an output in data communication with the engine speed control unit to output a throttle signal thereto which is optionally modified as above described.

3. A vehicle speed limiter in accordance with claim 1 wherein the speed sensor is adapted to make use of an existing vehicle system allowing for the sensing of speed.

4. A vehicle speed limiter in accordance with claim 3 wherein the speed sensor is adapted for fitment to the vehicle speedometer system to obtain a reading of speed therefrom.

5. A vehicle speed limiter in accordance with claim 1 adapted for use with a throttle signal unit including an electronic signal generator configured such that a varying voltage electronic signal is in inherently produced as the throttle member is operated to a varying extent, wherein the signal modifier unit is able to modify the generated electronic signal in that it is electrically connected to the electronic signal generator so as to be able to pull the generated voltage lower than it would otherwise be set to by the operation of the throttle member without operation of the speed limiter.

6. A vehicle speed limiter in accordance with claim 1 adapted to operate continuous successive cycles of speed sensing and throttle signal modification as necessary.

7. A vehicle speed limiter in accordance with claim 6 including speed limit control means adapted to effect such successive monitoring, and further adapted to apply a proportional control technique wherein, as the comparator detects that the limit speed is approached to a certain predetermined degree of closeness, the signal modifier begins to apply a signal modification which becomes stronger the near the vehicle comes to the limit speed.

8. A vehicle speed limiter in accordance with claim 1 wherein the throttle signal modifier unit includes a switching control unit which acts to pass an unmodified throttle signal when the comparator indicates that vehicle speed is below the limit speed, but acts to block the unmodified signal and/or transmit on a modified signal that tends to hold the vehicle at the limit speed when the comparator indicates that the limit speed has been reached or is being approached.

9. A vehicle speed limiter in accordance with claim 1 including input means to allow a user to input or vary the limit speed before use.

10. A vehicle speed limiter in accordance with claim 1 adapted to allow for the storage of a plurality of limit speeds, and to allow a user to switch between limit speeds and to allocate a limit speed to be applied selectively in that the data register includes a register to store a plurality of limit speeds, and an applied limit speed register to store a speed to be applied, and a means is provided to select for storage in the applied speed limit register one of the said stored limit speeds.

11. A vehicle speed limiter in accordance with claim 10 modified to provide a first limit speed and a second limit speed selected as to be appropriate limits respectively for off and on road conditions and further comprising a vibration sensor of a suitable sensitivity to tend to be actuated in off road conditions but not in driving conditions typically encountered on paved roads to effect automatic switching between the two limit speeds.

12. A vehicle speed limiter in accordance with claim 11 wherein the limiter system comprises a data register to store at least a first limit speed and a second limit speed, and an applied limit speed register to store one such limit speed as an applied limit speed; a vibration sensor and vibration control means configured such that the applied speed is set to the first limit speed below a vibration threshold level and to the second limit speed above a vibration threshold level; a vehicle speed sensor to output a signal indicative of vehicle speed; a comparator to compare the speed sensor output with the limit speed in the applied limit speed register; a throttle system modifier acting on the output of the throttle signal unit in use when fitted in conjunction with a vehicle throttle system as above to modify the generated throttle signal so that the transmitted throttle signal tends to limit the vehicle to the applied limit speed.

13. A vehicle throttle and engine speed control system comprising a mechanically actuatable throttle member; an engine speed controller; a throttle signal unit in data communication with an engine speed controller and operably coupled to the throttle member so as to generate an electronic throttle signal in functional response to the degree of actuation of the throttle member, and to transmit a throttle signal to the engine speed controller whereby the engine speed is controlled; and a vehicle speed limiter in accordance with claim 1.

14. A vehicle fitted with a vehicle throttle and engine speed control system in accordance with claim 13.

15. A method of fitment of a vehicle speed limiter to a vehicle having a throttle system comprising a mechanically actuatable throttle member, an engine speed controller, and a throttle signal unit in data communication with the engine speed controller and operably coupled to the throttle member so as to generate an electronic throttle signal in functional response to the degree of actuation of the throttle member, and to transmit a throttle signal to the engine speed controller whereby the engine speed is controlled, the method comprising the fitment of a vehicle speed limiter in accordance with claim 1 such that the throttle system modifier is configured to be able to act to modify a generated electronic throttle signal.

16. The method of claim 15 comprising fitting a vehicle speed sensor to obtain a signal indicative of vehicle speed; fitting a control unit in data communication therewith comprising a limit speed data register to include a data store for at least a first predetermined limit speed, a comparator to compare the speed sensor output with the limit speed stored in the limit speed register, and a throttle system modifier unit; wherein the throttle signal modifier unit is fitted in data communication with and able to act directly upon on the output of the throttle signal unit when so fitted to modify the generated throttle signal so that a throttle signal transmitted to the engine speed controller tends to limit the vehicle to the applied limit speed.

* * * * *